United States Patent [19]
Brown, Jr.

[11] 3,900,382
[45] Aug. 19, 1975

[54] MINIATURE PROBE CONTAINING MULTIFUNCTIONAL ELECTROCHEMICAL ELECTRODES

[75] Inventor: John F. Brown, Jr., Schenectady, N.Y.

[73] Assignee: General Electric Company, Schenectady, N.Y.

[22] Filed: Nov. 1, 1974

[21] Appl. No.: 519,796

[52] U.S. Cl............ 204/195 M; 128/2 E; 204/195 P
[51] Int. Cl. ........................................... G01n 27/46
[58] Field of Search........ 204/195 R, 195 P, 195 M, 204/195 L, 1 T; 128/2 E, 2.1 E; 324/29

[56] References Cited
UNITED STATES PATENTS 3,719,576  3/1973  Macur ........................... 204/195 P
3,730,868  5/1973  Niedrach ........................ 204/195 P
3,743,588  7/1973  Brown et al. ................... 204/195 M
3,767,553  10/1973 Brown et al. ................... 204/195 M Primary Examiner—G. L. Kaplan
Attorney, Agent, or Firm—Paul R. Webb, II; Joseph T. Cohen; Jerome C. Squillaro

[57] ABSTRACT

A miniature probe contains multifunctional electrochemical electrodes which measure both specific ion activities of samples and the carbon dioxide or oxygen activity of samples. The miniature probe includes a carbon dioxide sensor or an oxygen sensor. When the specific ion electrode of the probe is connected to an external reference electrode, a specific ion sensor is provided.

12 Claims, 1 Drawing Figure

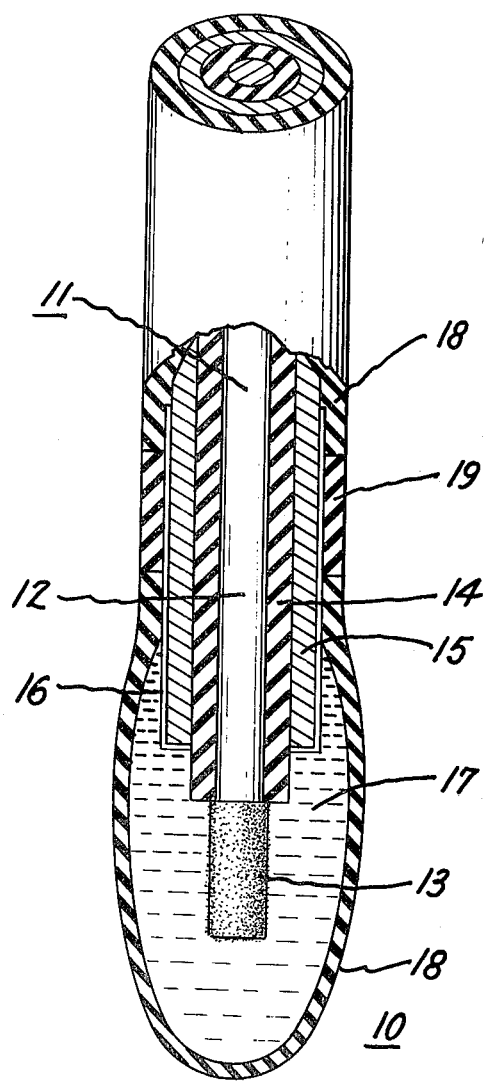

MINIATURE PROBE CONTAINING MULTIFUNCTIONAL ELECTROCHEMICAL ELECTRODES

This invention relates to a miniature probe containing multifunctional electrochemical electrodes and, more particularly, to such a miniature probe containing a carbon dioxide or oxygen sensor and a specific ion electrode.

Cross-references are made to the following patent applications: Ser. No. 519,793 filed concurrently herewith which application is entitled "Miniature Probe Having Multifunctional Electrodes for Sensing Ions and Gases" in the name of Robert A. Macur; Ser. No. 519,797 filed concurrently herewith which application is entitled "Miniature Probe Containing Multifunctional Electrochemical Sensing Electrodes" in the names of Leonard W. Niedrach and William H. Stoddard, Jr.; Ser. No. 519,794 filed concurrently herewith which application is entitled "Miniature Probe Containing Multifunctional Electrochemical Sensing Electrodes" in the names of Leonard W. Niedrach and William H. Stoddard, Jr.; Ser. No. 519,795 filed concurrently herewith which application is entitled "Miniature Probe Containing Multifunctional Electrochemical Sensing Electrodes" in the names of Leonard W. Niedrach and William H. Stoddard, Jr.; and Ser. No. 519,798 filed concurrently herewith which application is entitled "Miniature Multifunctional Electrochemical Sensor For Simultaneous Carbon Dioxide and pH Measurements" in the names of Oliver H. LeBlanc, Jr., Willard T. Grubb, and Robert A. Macur.

The above five cross-referenced patent applications are assigned to the same assignee as the present application.

Sensors are employed to determine the content of a specific substance in a fluid or atmosphere. For example, a sensor might be employed to determine the content of carbon dioxide in a sample, or its content of hydrogen ions or other ions in solution.

pH, carbon dioxide and oxygen sensors are known, respectively, in the prior art for measuring the hydrogen ion activity or pH of a sample, for measuring the carbon dioxide content of a sample, or for measuring the oxygen content of a sample. Carbon dioxide sensors are described in U.S. Pat. Nos. 3,673,069, 3,705,088, 3,709,812 and 3,719,576. Hydrogen ion or pH sensors are described and claimed in U.S. Pat. Nos. 3,671,414, 3,709,810 and 3,719,576. Oxygen sensors are described and claimed in U.S. Pat. Nos. 3,714,015 and 3,794,575. Methods of manufacturing sensors by successive layers are described in U.S. Pat. No. 3,798,750. All of the above patents are assigned to the same assignee as the present application.

Our present invention is directed to an improved miniaturized multifunctional probe which is suitable for biomedical, environment control and other applications which probe can be used in vivo or in vitro analysis.

The primary objects of our invention are to provide a rugged, accurate and miniaturized multifunctional probe for carbon dioxide, or oxygen and specific ion measurements.

In accordance with one aspect of our invention, a miniature probe contains a carbon dioxide or an oxygen sensor and a specific ion electrode.

These and various other objects, features and advantages of the invention will be better understood from the following description taken in connection with the accompanying drawings in which:

The single FIGURE is a partial sectional view of a miniature probe containing a carbon dioxide sensor and a specific ion electrode made in accordance with our invention.

In the single FIGURE of the drawing there is shown generally at 10 a miniature multifunctional probe comprising a carbon dioxide sensor and a pH electrode made in accordance with our invention. The carbon dioxide sensor is shown in the form of a flexible, elongated electrode lead 11 which has a base member and an exterior surface 12 of a metal selected from the class consisting of palladium and iridium on the base member. An electrochemically active region 13 adheres tightly to and is in electrical contact with one end portion of the metal surfaced base member 12. Electrochemically active region 13 is selected from the class consisting of the respective oxide of the exterior surface metal. Other coatings showing electrochemical response to carbon dioxide changes could also be used. A layer 14 of electrical insulation is disposed on the surface of the metal surfaced base member.

A second electrode lead 15 surrounds at least partially and is spaced from the metal surfaced base member 12. A second electrochemically active region 16 of silver and a silver halide is formed on lead 15 to provide a reference electrode for the sensor. An electrolyte 17, which is preferably aqueous and immobilized, contacts both electrochemically active regions 13 and 16. An outer sheath 18 of carbon dioxide permeable diffusion barrier material encapsulates at least electrochemically active regions 13 and 16, and electrolyte 17.

The specific ion electrode is formed as a second outer sheath 19 of specific ion-permeable barrier material, such as hydrogen ion-permeable material. Sheath 19 surrounds a portion of second electrode lead 15 and is in direct contact with its silver and silver halide region 16. Outer sheaths 18 and 19 form a continuous cover for probe 10.

We found that we could form the above improved miniature probe by a method of applying successive elements or layers by immersing or dipping the initial metal surfaced member in various organic solutions after which each solution solvent was evaporated. The application of the successive layers is preferably accomplished by immersion steps but other suitable means include coating, spraying, brushing, etc. The use of immersion steps is described and claimed in the above referenced U.S. Pat. No. 3,798,750.

The miniature probe of our invention can be formed by employing for the initial support wire a noble metal of palladium or iridium. The first electrochemically active region for the sensing electrode is palladium oxide or iridium oxide. In the event that a base metal member other than palladium is employed, a layer of palladium or iridium must be deposited on at least the end portion thereof so that the portion can be oxidized. The electrode lead can be silver or gold. If gold is employed, silver is deposited on at least a portion thereof. The second electrochemically active region which is applied to the electrode lead is a silversilver halide except a fluoride.

Various electrical insulating materials are usable and many of such materials can be applied by coating steps.

Preferred materials, include Viton hexafluoropropylenevinylidene fluoride rubber, Alkanex polyester resin lacquer, silicone rubbers, and polypropylene oxides. I prefer to employ Alkanex polyester resin lacquer which provides the desired electrical insulation and which can be applied by coating or dipping. The Alkanex polyester resin lacquer can be cross-linked by heating to insolubilize and thereby facilitate the application of successive layers. A carbon dioxide permeable material is required as an outer sheath to encapsulate the palladium oxide region, at least the silver and silver halide region of the second electrode lead, and the electrolyte. Such a diffusion barrier material is electrically insulating and has an appropriate permeability coefficient for carbon dioxide to be sensed. Since this material is electrically insulating, the diffusion barrier sheath and the second layer of insulation can be made of one of these materials. Thus, the separate second layer of electrical insulation can be eliminated. This outer sheath is a membrane made in accordance with U.S. Pat. No. 3,705,088 which is assigned to the same assignee as the present application. This patent and its subject matter are incorporated by reference herein.

The specific ion electrode is in the form of a second outer sheath of specific ion-permeable barrier material which surrounds and is in contact with the silver and silver halide region of the second electrode lead. A separate conventional reference electrode such as a silver-silver chloride electrode is used with the specific ion electrode thereby providing a specific ion sensor. The second outer sheath can, for example, be a hydrogen, potassium or calcium ion-permeable barrier material. Such material can be applied to an uncoated portion of the silver and silver halide region thereby forming a continuous cover for the probe. The hydrogen, potassium, calcium or other specific ion can be applied to a portion of the polymer covering the probe and allowed to diffuse into the polymer to form the second outer sheath. Specific hydrogen ion-permeable diffusion barrier materials are described and claimed in U.S. Pat. No. 3,743,588 and may comprise a hydrophobic elastomer polymer with a dielectric constant from 4 to 13 and a $H^+$ ion carrier which is an uncoupler known to uncouple oxidative phosphorylation in mitochondria and chloroplasts, the uncoupler being rendered hydrophobic and lipophilic. Specific potassium ion-permeable diffusion barrier materials are described and claimed in U.S. Pat. No. 3,767,553 and may comprise a mixture of a hydrophobic elastomeric polymer of an organopolysiloxane polycarbonate block copolymer with a dielectric constant of from 4 to 13 and a potassium ion-specific carrier selected from the group consisting of cyclic peptides, cyclic depsipeptides, cyclic lactones, cyclic ethers, and mixtures thereof. Both of these patents are assigned to the same assignee as the present application. Both of these patents and the subject matter thereof are hereby incorporated by reference.

My miniature probe can be formed by applying successive elements from various organic solutions after which each solution solvent is evaporated. The application of the successive layers is preferably accomplished by a series of immersion or application coating steps.

With reference to the single FIGURE of the drawing, a miniature probe is formed in accordance with my invention by employing as the electrode lead a 20 mil palladium wire 11, the base or support, upon which the successive elements are applied. The wire has its central portion immersed in a solution of Alkanex polyester resin lacquer to apply a first layer of electrical insulation 14 on electrode lead 11. It will be appreciated, of course, that a tube of insulation could be applied over the central portion of the electrode lead by slipping the tube over the lead. Opposite ends of wire 11 are exposed and not coated by insulation 14. An electrochemically active region 13 is formed in electrical contact with wire 11 by roughening a portion at one exposed end of the electrode lead by sand blasting and then applying a palladium oxide region. The opposite exposed end (not shown) is provided for subsequently applying an electrical lead thereto.

A second electrode lead 15 is formed of silver or gold and is applied to surround the wire 11 by painting or plating the silver or the gold thereon or a silver tube may be used. A second active region 16 at one end of the gold or silver is silver and silver chloride which silver chloride is applied by a chloriding step such as anodization in a chloride solution. If gold is employed, silver is deposited electrochemically and then silver chloride is formed on its surface. A second layer of electrical insulation can be applied over second electrode lead 15 except for the chlorided region and for a small region at the upper end for subsequently applying an electrical lead thereto. However, I prefer to employ the subsequently applied first diffusion barrier in this manner thereby eliminating the need for a separate electrically insulating coating on electrode lead 15. The lower end of the structure with electrochemically active region 13 is coated with a solution of sodium bicarbonate and sodium chloride with a thickening agent thereby forming an electrolyte 17. Electrolyte 17 is in contact with both regions 13 and 16. A first diffusion barrier of carbon dioxide permeable material is then applied as a first outer sheath 18 encapsulating the electrically active regions 13 and 16 and electrolyte 17. A second diffusion barrier of a specific ion, such as $H^+$, permeable material is then applied as a second outer sheath 19 in contact with silver and silver halide region 16 thereby forming a pH electrode. Second outer sheath 19 with first outer sheath 18 forms a continuous cover for probe 10. The pH electrode is used with a second separate reference electrode such as a silver-silver halide electrode which is immersed in the same sample medium as the probe. The carbon dioxide sensor is self-contained within the miniature probe.

The electrolyte is an aqueous solution, or an aqueous immobilized solution. A suitable aqueous electrolyte is 0.01 molar bicarbonate and 0.14 molar sodium chloride. The aqueous electrolyte can be immobilized, for example, with a conventional thickening or gelling agent. Such aqueous electrolytes and applications are described in above-mentioned U.S. Pat. No. 3,719,576. This patent and its subject matter are hereby incorporated by reference.

The resulting device is a miniature probe containing multifunctional electrochemical electrodes. The carbon dioxide sensor and the pH electrode of the miniature probe, with a reference electrode, can be used for clinical and other analyses. A high impedance electrometer is connected to the electrodes of the probe. In this manner the terminal voltage can be read across the electrodes containing the first active region 13 and the second active material 16. This terminal voltage from electrode leads 11 and 15 in operation will be a function of the carbon dioxide partial pressure in equilibrium with it. The terminal voltage can also be read separately across the electrode lead 15 and the second separate reference electrode. This terminal voltage from this sensor in operation will be a function of the pH.

In a second embodiment of my invention, a miniature probe can be formed containing an oxygen sensor and a specific ion electrode. This embodiment is quite similar to the above first embodiment except that the specific ion electrode, such as an $H^+$ ion electrode, is formed by a second outer sheath in contact with a metallic electrode lead in an oxygen sensor. The above-mentioned U.S. Pat. Nos. 3,714,015 and 3,794,575 are examples of oxygen sensors. Both of these patents and their subject matter are hereby incorporated by reference. My miniature probe can employ an oxygen sensor from one of the above-referenced patents. A specific ion electrode is applied to such an oxygen sensor as described above in the first embodiment. The resulting device is a miniature probe made in accordance with my invention.

Examples of miniature probes made in accordance with our invention are as follows:

EXAMPLE 1

A miniature probe is formed in accordance with the above description and as generally shown in the single FIGURE of the drawing. The metal surfaced base member is in the form of a 20 mil palladium wire, one end of which had been coated with palladium oxide. This is accomplished by dipping that end of the wire in 50 weight percent sodium hydroxide in water, heating the wire to 800°C in air for 20 minutes, cooling the wire, rinsing it in distilled water, and drying in air before applying insulation.

The remainder of the metal surfaced base member, with the exception of about 1 centimeter at the opposite end, is coated with Alkanex polyester resin lacquer. This is accomplished by immersing in a solution of Alkanex polyester resin lacquer. The coated wire is heated at a temperature of 100°C to evaporate the solvent and then to 200°C to cross-link the coating. This coating step is repeated several times. The reference electrode is silver which is applied as a lacquer over the first insulation. The lacquer employs Alkanex polyester resin lacquer as the binder for silver flake. Application is accomplished as above for the first insulation. Only one coat is applied. The silver coating adjacent to the first palladium oxide region is chlorided anodically at a current of 0.5 milliamperes using 0.1 N HCl bath with a platinum electrode serving as the counter electrode. The sequence of the chloriding is 2 minutes anodic, 2 minutes cathodic and 10 minutes anodic.

After this second electrochemically active region has been found, the lower end of the structure has applied thereon an aqueous immobilized electrolyte of 0.0065 molar sodium bicarbonate and 0.15 molar sodium chloride.

A second layer of electrical insulation is then applied over the second electrode lead excluding the silver chloride portion and over the electrolyte including the palladium oxide portion by dipping the structure wire in a solution of a polysiloxypolycarbonate polymer in chloroform. The chloroform is removed by heating for 5 to 10 minutes in a nitrogen atmosphere at 50°C. The resulting first outer sheath of polymer film is a carbon dioxide permeable diffusion barrier and has electrical insulating properties. Thus, in addition to an insulating layer being formed over the second electrode lead, a carbon dioxide permeable diffusion barrier encapsulates both of the electrically active regions and the electrolyte. A ring of the first outer sheath adjacent the silver-silver chloride region was stripped away. A hydrogen ion-permeable diffusion barrier is applied to the stripped ring area from a solution of a polysiloxypolycarbonate polymer containing 1 percent p-octadecyloxym-chlorophenylhydrazone mesoxalonitrile in ethylene dichloride. The ethylene dichloride was removed by evaporation at ambient temperature. The resulting structure is a miniature probe made in accordance with my invention.

EXAMPLE 2

A miniature probe is formed in accordance with the above description and as generally shown in the single FIGURE of the drawing. This is accomplished generally as described above in Example 1 except the second section of the outer sheath is applied to a probe structure containing an oxygen sensor rather than a carbon dioxide sensor as in Example 1. The oxygen sensor which is employed is described and claimed in above referenced U.S. Pat. No. 3,794,575. The resulting structure is a miniature probe made in accordance with my invention.

While other modifications of the invention and variations thereof which may be embraced within the scope of the invention have not been described, the invention is intended to include such as may be embraced within the following claims.

What I claim as new and desire to secure by Letters Patent of the United States is:

1. A miniature probe containing a carbon dioxide sensor and a specific ion electrode which comprises a flexible metallic elongated electrode lead, an electrochemically active region responsive to carbon dioxide changes adhering tightly to and in electrical contact with one end portion of the electrode lead, electrical insulation surrounding the electrode lead, a second metal electrode lead surrounding at least partially and spaced from the first electrode lead by the electrical insulation thereon, the second electrode containing a second electrochemically active region of silver and silver halide thereon, an electrolyte contacting both electrochemically active regions, a first outer sheath of a carbon dioxide permeable diffusion barrier material encapsulating at least both electrochemically active regions and the electrolyte thereby forming a carbon dioxide sensor, outer electrical insulation surrounding at least partially the second electrode lead, and a second outer sheath of specific ion-permeable barrier material surrounding a portion of the second electrode lead and in contact with its silver and silver halide region thereby forming a specific ion electrode, the outer electrical insulation and first and second sheaths forming a continuous cover for the probe.

2. A miniature probe as in claim 1, in which the second outer sheath is a hydrogen ion-permeable barrier material.

3. A miniature probe as in claim 1, in which the second outer sheath is a potassium ion-permeable barrier material.

4. A miniature probe as in claim 1, in which the second outer sheath is a calcium ion-permeable barrier material.

5. A miniature probe as in claim 1, in which the second outer sheath is a hydrogen ion-permeable barrier material of a hydrophobic elastomer polymer with a dielectric constant of from 4 to 13, and a $H^+$ on carrier which is an uncoupler known to uncouple oxidative phosphorylation in mitochondria and chloroplasts, the uncoupler being rendered hydrophobic and lipophilic.

6. A miniature probe as in claim 1, in which the second outer sheath is a potassium ion-permeable barrier material of a mixture of a hydrophobic elastomeric polymer of an organopolysiloxane polycarbonate block copolymer with a dielectric constant of from 4 to 13, and a potassium ion-specific carrier selected from the group consisting of cyclic peptides, cyclic depsipeptides, cyclic lactones, cyclic ethers, and mixtures thereof.

7. A miniature probe containing an oxygen sensor and a specific ion electrode which comprises a flexible metallic elongated electrode lead, an electrochemically active region responsive to oxygen changes adhering tightly to and in electrical contact with one end portion of the electrode lead, electrical insulation surrounding the electrode lead, a second metal electrode lead surrounding at least partially and spaced from the first electrode lead by the electrical insulation thereon, the second electrode containing a second electrochemically active region of silver and silver halide thereon, an electrolyte contacting both electrochemically active regions, a first outer sheath of an oxygen permeable diffusion barrier material encapsulating at least both electrochemically active regions and the electrolyte thereby forming an oxygen sensor, outer electrical insulation surrounding at least partially the second electrode lead, and a second outer sheath of specific ion-permeable barrier material surrounding a portion of the second electrode lead and in contact with its silver and silver halide region thereby forming a specific ion electrode, and the outer electrical insulation and first and second sheaths forming a continuous cover for the probe.

8. A miniature probe as in claim 7, in which the second outer sheath is a hydrogen ion-permeable barrier material.

9. A miniature probe as in claim 7, in which the second outer sheath is a potassium ion-permeable barrier material.

10. A miniature probe as in claim 7, in which the second outer sheath is a calcium ion-permeable barrier material.

11. A miniature probe as in claim 7, in which the second outer sheath is a hydrogen ion-permeable barrier material of a hydrophobic elastomer polymer with a dielectric constant of from 4 to 13, and a $H^+$ ion carrier which is an uncoupler known to uncouple oxidative phosphorylation in mitochondria and chloroplasts, the uncoupler being rendered hydrophobic and lipophilic.

12. A miniature probe as in claim 7, in which the second outer sheath is a potassium ion-permeable barrier material of a mixture of a hydrophobic elastomeric polymer of an organopolysiloxane polycarbonate block copolymer with a dielectric constant of from 4 to 13, and a potassium ion-specific carrier selected from the group consisting of cyclic peptides, cyclic depsipeptides, cyclic lactones, cyclic ethers, and mixtures thereof.

* * * * *